No. 609,546. Patented Aug. 23, 1898.
A. HOUGH.
BREAD RAISER.
(Application filed Dec. 31, 1897.)

(No Model.)

Witnesses:
Richard S. Harrison
William J. Fawcett

Inventor
Amanda Hough
Per
O. D. Levis
Att'y

THE NORRIS PETERS CO., PHOTO-LITHO., WASHINGTON, D. C.

UNITED STATES PATENT OFFICE.

AMANDA HOUGH, OF JACOB'S CREEK, PENNSYLVANIA.

BREAD-RAISER.

SPECIFICATION forming part of Letters Patent No. 609,546, dated August 23, 1898.

Application filed December 31, 1897. Serial No. 665,076. (No model.)

*To all whom it may concern:*

Be it known that I, AMANDA HOUGH, a citizen of the United States, residing at Jacob's Creek, in the county of Westmoreland and State of Pennsylvania, have invented certain new and useful Improvements in Bread-Raisers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in a bread-raising cabinet.

The invention has for its object the provision of a receptacle for raising dough previous to baking the same.

With the above object in view the invention finally consists in the novel construction, combination, and arrangements of parts, as will be hereinafter more specifically described in detail.

In describing the invention in detail reference is had to the accompanying drawings, forming a part of this specification, and wherein like letters and numerals of reference designate like parts throughout the several views, in which—

Figure 1:
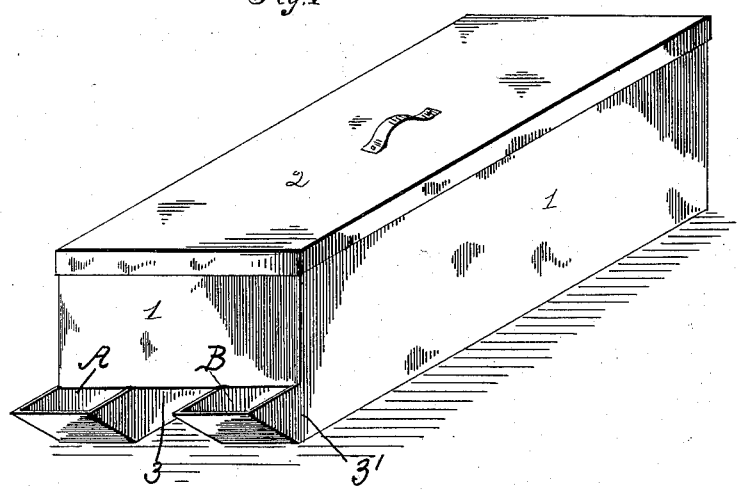
Figure 2:
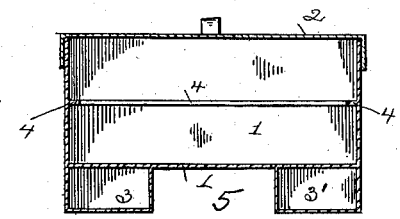
Figure 3:
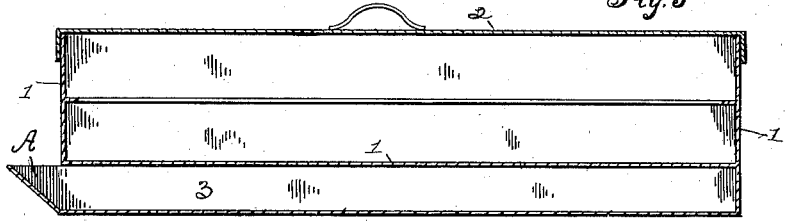

Figure 1 is a perspective view of my improved bread-raiser. Fig. 2 is an end sectional view. Fig. 3 is a longitudinal sectional view.

The numeral 1 indicates a rectangular-shaped receptacle provided with a removable lid 2. A flange 4 is arranged around the interior of the sides of the receptacle 1 and is designed to form a firm support for the baking-pans.

3 and 3' indicate oblong water-troughs which are arranged beneath the under side of the receptacle and extend the entire length thereof and are each provided with open extended portions A and B, through which the water is poured. If found necessary, any suitable means may be employed for closing these openings A and B. By arranging these water-troughs 3 and 3' at each side of the bottom of the receptacle 1 a heating-space 5 is left between them. This is a very important feature of my invention for the reason that it affords a means of communicating the heat from the stove without first heating the water in the troughs, as is usual in inventions of this class which are formed with one water-trough and no chamber, and it will also be obvious that as the heat is communicated in this manner it will be what is termed a "slow" heat. Abundant time will be given the bread to be warmed sufficiently before the water in the troughs is heated sufficiently to raise the bread.

While in the drawings I have shown the water-troughs formed as a part of the receptacle, it will be understood that they may be made separate and provided with any suitable means for attaching them to the receptacle.

It will be readily seen that by means of the interior flange 4 it will be possible to place bread-pans thereon and upon the bottom of the receptacle when necessary to raise a large quantity of bread. It will also be obvious that more than one flange could be provided.

Having thus fully shown and described my invention, what I claim as new, and desire to secure by Letters Patent, is—

1. A bread-raiser consisting of a receptacle provided at its under side with parallel water-troughs so arranged whereby a heating-chamber is left between them, substantially as described.

2. A bread-raiser consisting of a receptacle provided with interior pan-supports, in combination with water-troughs arranged beneath the said receptacle and provided with a heating-space therebetween, substantially as described.

3. A bread-raiser consisting of a receptacle having formed upon its under side a pair of parallel rectangular water-troughs so arranged whereby a direct-heating chamber is left between them, one end of each of said troughs being extended and provided with an opening for the admission of water, substantially as described.

4. A bread-raiser consisting of a rectangular receptacle provided with interior flanges adapted to support the pans, in combination with a pair of rectangular water-troughs extending the entire length of the said receptacle and provided with extended open-end portions, said water-troughs being so arranged beneath the said receptacle whereby a heating-space is left between them, substantially as described.

In testimony whereof I affix my signature in presence of two witnesses.

AMANDA HOUGH.

Witnesses:
H. E. BECKER,
JOHN GROETZINGER.